United States Patent Office 3,769,276
Patented Oct. 30, 1973

3,769,276
SELENIUM AND TELLURIM COMPOUNDS OF HALOGENATED ARENES AND PREPARATION
Erwin Klingsberg, Mountainside, N.J., assignor to American Cyanamid Company, Stamford, Conn.
No Drawing. Continuation-in-part of abandoned application Ser. No. 701,076, Jan. 29, 1968. This application Aug. 5, 1971, Ser. No. 169,501
Int. Cl. C07d 81/00, 83/00
U.S. Cl. 260—239 R          6 Claims

ABSTRACT OF THE DISCLOSURE

A compound having the following formula is provided:

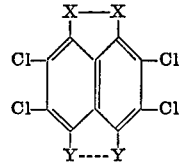

wherein X is selenium or tellurium in a peri bridge to the 1 and 8 positions of the naphthalene nucleus, Y is chlorine or X, and when Y is X, the two Y are in a peri bridge to the 4 and 5 positions of the naphthalene nucleus. These compounds are useful biocides and pigments, as well as serving as starting materials for the preparation of dielectric compounds. In addition, a method for preparing such compound is also provided.

CROSS-REFERENCE TO RELATED APPLICATIONS

This application is a continuation-in-part of United States application Ser. No. 701,076, filed on Jan. 29, 1968, now abandoned.

This invention relates to heterocyclic and carbocyclic selenium and tellurium compounds and methods of preparation.

More particularly, the invention relates to liquid arene compounds in which halo groups are displaced by elemental selenium or tellurium.

According to the present invention, it has been discovered that elemental selenium or tellurium reacts at temperatures of from about 250° C. to about 400° C., preferably in a stream of inert gas such as nitrogen and the absence of oxygen, with an arene substituted by at least three aoms of a halogen of atomic weight below 100 (fluorine, chlorine, bromine). Halogen in the alpha positions (carbon atoms 1, 4, 5 and 8) is displaced by the selenium or tellurium and the products contain one or more atoms of selenium or tellurium, depending upon the time and temperature of the reaction and the particular starting material employed. When two or more selenium or tellurium atoms are incorporated into the molecule, at least two of the atoms attach to adjacent alpha carbon atoms to form a peri bridge.

With more highly halogenated starting materials, higher degrees of substitution are obtainable. For example, octachloronaphthalene reacts with selenium or tellurium to form products of the type

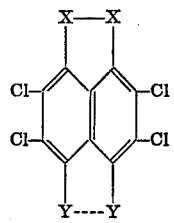

wherein X is selenium or tellurium and Y is X or chlorine. Where Y is X, there is a bond between the Y groups. Thus one or two diseleno or ditelluro bridges are formed displacing the chlorine atoms in the alpha positions:

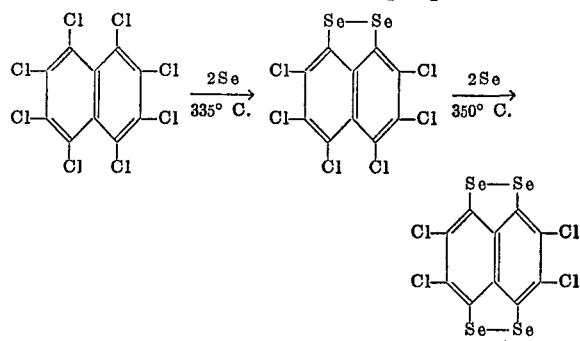

A higher temperature is needed for the reaction with tellurium than for selenium. Further, formation of the bis-peri compound requires a higher temperature than the mono-peri. Thus, the peri diseleno compound is formed at about 335–340° C., the bis-peri (tetra selenide) compound forms at about 350° C., the peri ditelluro compound is formed at about 345–350° C., and the bis-peri (tetra telluride) compound forms at still higher temperatures. The tri selenide and tri telluride compounds are formed at intermediate temperatures or in admixture with the tetra selenides or tellurides.

The halo-naphthalene starting materials are known and, in most instances, are commercially available. Typical halonaphthalenes are mixtures of tri- and tetrachloronaphthalenes, mixtures of penta- and hexachloronaphthalenes, and octachloronaphthalene. Each intermediate compound has at least one alpha halogen atom. The 1-chloronaphthalene is inoperative in this invention.

In general the products and any unchanged starting material are separated from unchanged selenium or tellurium by extraction with an inert solvent such as hot or boiling trichloroethylene or pyridine, hexane, or methylcyclohexane, from which the product crystallizes. The products may also be crystallized from chlorobenzene, methoxy-, ethoxy- or butoxyethanol. These and other conditions of reaction, such as order of addition, proportions of reactants, and time of reaction, are not critical and may be varied as desired for efficiency and economy.

The products of this invention have biocidal, including fungicidal, activity. They are also useful as pigments and as starting materials for preparing dielectric compounds as illustrated hereinafter.

The following examples are provided for illustrative purposes and may include particular features of the invention. However, the examples should not be construed as limiting the invention, many variations of which are possible without departing from the spirit or scope thereof.

EXAMPLE 1

3,4,5,6,7,8-hexachloronaphtho[1,8-cd]-1,2-diselenole

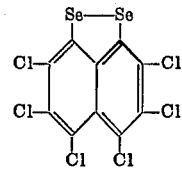

A mixture of 12.0 grams octachloronaphthalene and 7.2 grams powdered selenium was heated at 335–340° C. for seven and one-half hours in a stream of nitrogen. The molten product was poured out, cooled, ground, and freed of any unreacted octachloronaphthalene by extraction with hexane. It was separated from unchanged selenium by continuous extraction with boiling pyridine, from which it crystallized as a brown solid, melting point, 340° C.

When 0.2% by weight of the product was incorporated in unstabilized polypropylene by milling on a two-roll laboratory mill at 165-175° C. and then compressing molding at 170-180° C. into a 15-mil film, it increased the stability of the polypropylene from 40-60 hours to 140-160 hours as measured in a carbonarc Fadeometer.

EXAMPLE 2

1,2,3,6,7,8-hexachloronaphthalene

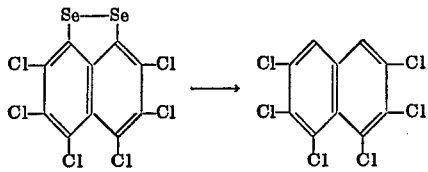

Two grams of the product of Example 1 was stirred and refluxed in 75 milliliters 2-diethylaminoethanol while 35 grams Raney nickel catalyst was added during a fifteen-minute period. The solution was filtered, cooled, and diluted with water. The separated product may be crystallized from hexane and is a useful capacitor impregnant for dielectrics.

EXAMPLE 3

3,4,7,8-tetrachloronaphtho[1,8-cd:4,5-c'd'] bis[1,2]diselenole

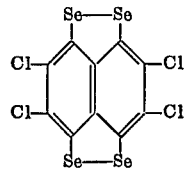

A mixture of 1.5 grams of the diselenide of Example 1 and 5.0 grams powdered selenium was heated at 350° C. for four hours in a stream of nitrogen. The product was purified by continuous extraction with trichloroethylene or pyridine, giving golden brown crystals unmelted at 360° C. It also crystallizes from chlorobenzene. By the procedure of Example 2, this is converted to 2,3,6,7-tetrachloronaphthalene, a useful capacitor for dielectrics.

EXAMPLE 4

3,4,5,6,7,8-hexachloronaphtho[1,8-cd]-1,2-ditellurole

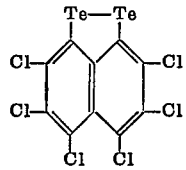

A mixture of 10 grams octachloronaphthalene and 1.0 gram powdered tellurium was heated at 345-350° C. for four and one-half hours in a stream of nitrogen. Unchanged octachloronaphthalene was removed by digestion with hot methylcyclohexane, and the product crystallized from ethoxyethanol; melting point, 315° C. This product converts to 1,2,3,6,7,8-hexachloronaphthalene by the procedure of Example 2.

EXAMPLE 5

Mixed tri- and tetrachloronaphtho diselenole

A mixture of 7.0 grams selenium and 12 grams of a mixture of penta and hexachloronaphthalenes was heated in a stream of nitrogen at 300° C. for two hours. After removal of starting material by hexane extraction, the product was dissolved in pyridine, filtered, and diluted with water. It may also be purified by acetic acid. The product, when heated, remained unmelted at 360° C. Analysis showed two atoms of selenium per naphthalene nucleus.

EXAMPLE 6

Mixed di- and trichloronaphtho selenol

The procedure of Example 5 was followed with a mixture of tri and tetrachloronaphthalenes. The product was purified by crystallization from methylcyclohexane. Analysis showed the presence of one selenium atom per naphthalene nucleus.

EXAMPLE 7

Tribromobenzoselenol

A mixture of 6.0 grams selenium and 10.0 grams 1,2,4,5-tetrabromobenzene was fused for one-half hour at 280-290° C. in a nitrogen atmosphere. After removal of starting material by hexane extraction, the product was dissolved in pyridine, filtered, and recovered by dilution. It analyzed for approximately one atom of selenium for each benzene ring.

EXAMPLE 8

The compound prepared in Example 1 was evaluated as a pigment employing a Hoover-Muller rubout test. The test is similar to the standard Hoover-Muller rubout technique described in the American Society for Testing Materials, specification 52T, 1952.

A base color paste was first prepared by mixing 0.5 gram of the compound prepared in Example 1 and 0.8 gram of a vehicle (100 parts of No. 1 Transparent Litho Varnish and 4 parts of 3.5% cobalt paste drier of the lineolate type) and mulling 8 times, 100 revolutions each, at 150 pounds pressure. A drawdown of the base paste was made on bond paper. The drawdown was exposed in a Fadeometer and after 300 hours of exposure there was only a trace of fading.

A tint paste was made by blending 0.1 gram of the above base color paste and 2 grams of titanium dioxide vehicle (500 parts rutile titanium dioxide, 240 parts of No. 1 Transparent Litho Varnish and 20 parts cobalt drier of the lineolate type) and a drawdownn on bond paper was made. When the drawdown was exposed in a Fadeometer for 300 hours, there was moderate fading.

For purposes of comparison, the light fastness of 3,4,5,6,7,8 - hexachloronaphtho[1,8-cd]-1,2-dithiole was determined using the test procedure hereinabove described. The compound was prepared by the procedure set forth in Example 1 of United States Pat. No. 2,905,695.

The drawdown of the base color paste showed considerable fading after 100 hours exposure in a Fadeometer. The drawdown of the tint paste showed moderate to considerable fading after 100 hours exposure.

What is claimed is:

1. The compound 3,4,7,8-tetrachloronaphtho 1,8-cd:4,5-c'd']bis-[1,2]diselenole.

2. A method for preparing a compound having the formula:

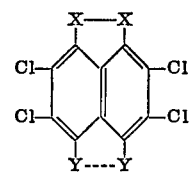

wherein X is selenium or tellurium in a peri bridge to the 1 and 8 positions of the naphthalene nucleus, Y is chlorine or X, and when Y is X, the two Y are in a peri bridge to the 4 and 5 positions of the naphthalene nucleus, which comprises reacting octachloronaphthalene with selenium or tellurium at temperatures of from about 250° to 400° C. in the absence of oxygen.

3. A method according to claim 2 wherein the naphthalene reactant is a mixture of pentachloronaphthalene and hexachloronaphthalene.

4. A method according to claim 2 wherein octachloronaphthalene is reacted with selenium at a temperature of from about 250° to 340° C. whereby 3,4,5,6,7,8-hexachloronaphtho[1,8-cd]-1,2-diselenole is formed.

5. A method according to claim 2 wherein octachloronaphthalene is reacted with selenium at a temperature of from about 350° to 400° C. whereby 3,4,7,8-tetrachloronaphtho[1,8-cd:4,5-c'd']bis(1,2-diselenole) is formed.

6. A method according to claim 2 wherein octachloronaphthalene is reacted with tellurium at a temperature of from about 345° to 350° C. whereby 3,4,5,6,7,8-hexachloronaphtho[1,8-cd]-1,2-ditellurole is formed.

References Cited

UNITED STATES PATENTS 2,905,695    9/1959    Thelin _____ 260—327

OTHER REFERENCES

Katritzky et al., "Heterocyclic Chemistry" (London, 1960), pp. 252–253.

Morton, "The Chemistry of Heterocyclic Compounds" (New York, 1946), p. 54.

Houben-Weyl, "Methoden des Organischen Chemie, vol. IX (Stuttgart, 1955), pp. 929–930 (attached to Exhibit A).

ALTON D. ROLLINS, Primary Examiner

U.S. Cl. X.R.

252—63.7; 260—45.8 R, 650 R; 424—244

UNITED STATES PATENT OFFICE
CERTIFICATE OF CORRECTION

Patent No. 3,769,276  Dated October 30, 1973

Inventor(s) Erwin Klingsberg

It is certified that error appears in the above-identified patent and that said Letters Patent are hereby corrected as shown below:

Column 1, line 49, "aoms" should read -- atoms --.

Column 3, line 6, "compressing" should read -- compression --.

Column 4, line 38, "drawdownn" should read -- drawdown --.

Signed and sealed this 2nd day of April 1974.

(SEAL)
Attest:

EDWARD M. FLETCHER, JR.
Attesting Officer

C. MARSHALL DANN
Commissioner of Patents